Sept. 12, 1939.   R. A. HARTLEY ET AL   2,172,887
ELECTRICAL RECTIFIER
Filed Oct. 21, 1937
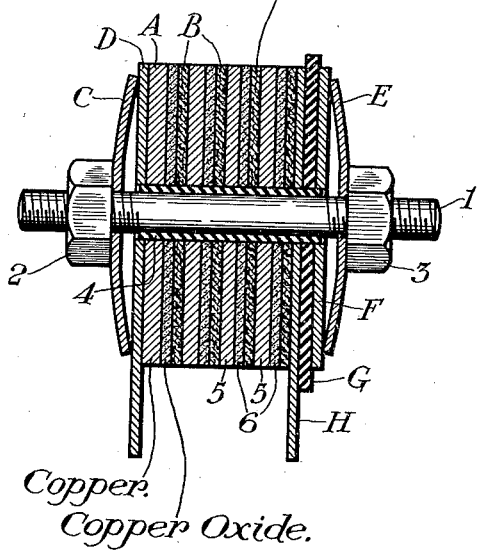
INVENTORS
Richard A. Hartley and
Craig M. Bouton
BY
THEIR ATTORNEY Patented Sept. 12, 1939

2,172,887

UNITED STATES PATENT OFFICE 2,172,887

ELECTRICAL RECTIFIER

Richard A. Hartley, Penn Township, Allegheny County, Pa., and Craig M. Bouton, Canyon, Calif., assignors to The Union Switch & Signal Company, Swissvale, Pa., a corporation of Pennsylvania Application October 21, 1937, Serial No. 170,260

6 Claims. (Cl. 175—366)

Our invention relates to electrical rectifiers, and particularly to electrical rectifiers of the dry disc type.

One object of our invention is to provide novel means for making electrical contact with the asymmetric units of a rectifier of the type described.

We shall describe one form of rectifier embodying our invention, and shall then point out the novel features thereof in claims.

The accompanying drawing is a vertical, longitudinal, sectional view showing one form of electrical rectifier embodying our invention.

Referring to the drawing, the rectifier here illustrated comprises a bolt 1 provided with nuts 2 and 3, and surrounded by an insulating sleeve 4 upon which are supported a plurality of asymmetric units, each designated by the reference character A, and each comprising a plate 5 of metal such as copper having a coating 6 of a compound of the metal formed thereon. For example, the coating 6 may be cuprous oxide. Asymmetric units of the type described exhibit the characteristic of offering a higher resistance to current tending to flow from the copper to the oxide than to current tending to flow in the opposite direction through the unit.

In constructing rectifiers of the type described, it is necessary, if the rectifier is to be efficient, to make good electrical contact with the copper on the one side of each unit and with the oxide coating on the other side of each unit. Since the copper has a low specific resistance, it is a relatively easy matter to make contact with it, but the oxide being rough, and having a relatively high specific resistance, presents a much more difficult problem.

We have found that a good electrical connection can be made between the units of a rectifier of the type described by spacing them apart by means of electrodes B, each consisting of a mixture of fibrous material and conducting material. The fibrous material may, for example, comprise cellulose fibre such as is used in the manufacture of paper, the fibre preferably being of a rather coarse or porous type, while the conducting material may comprise finely pulverized carbon or a finely pulverized metal which will not readily oxidize, as copper, gold or silver. The electrodes may be formed by first thoroughly mixing a mass of the fibrous material with the conducting material and then pressing the resultant mixture into discs of the proper shape, or a sheet of porous fibrous material may be impregnated by immersing it in a colloidal solution of the conducting material, and discs of the proper shape may then be punched or otherwise cut out of the impregnated sheet. The contact between the electrodes and the oxide surface of the units may in some instances be improved either by rubbing finely divided carbon into the outer surface of the cuprous oxide, or by painting such surface with a colloidal emulsion of carbon in water such, for example, as the commercial product known as "Aquadag". Aquadag may also be used for impregnating the electrodes.

Interposed between the nut 2 and the left-hand unit A is a spring washer C and a conducting plate D, and interposed between the nut 3 and the right-hand electrode B is a spring washer E, a pressure plate F, an insulating plate G, and a conducting plate H. The two spring washers C and E serve to maintain a uniform pressure on the units and the electrodes, whereby the electrodes are firmly pressed into intimate contact with the oxide surface of the units, while the two plates D and H serve as a means for making connection to a source of current supply. It should be noted that when the rectifier is connected to a source of current supply, the rectifier will offer a relatively low resistance to current flowing from plate H to plate D and a relatively high resistance to current flowing in the opposite direction.

One advantage of electrodes embodying our invention is that these electrodes have a low resistance and will not flow under heat and pressure.

Other advantages of electrodes embodying our invention are that they are flexible, durable, and inexpensive.

Although we have herein shown and described only one form of electrical rectifiers embodying our invention, it is understood that various changes and modifications may be made therein within the scope of the appended claims without departing from the spirit and scope of our invention.

Having thus described our invention, what we claim is:

1. An electrical rectifier comprising an asymmetric unit consisting of a copper disc having a layer of copper oxide formed on one side thereof, and an electrode in contact with the oxide layer of said unit consisting of a mixture of fibrous material and conducting material.

2. An electrical rectifier comprising an asymmetric unit consisting of a copper disc having a layer of copper oxide formed on one side thereof, finely divided carbon applied to the oxide surface of said unit, and an electrode pressed into intimate contact with the carbonized surface of said unit, said electrode consisting of a mixture of fibrous material and conducting material.

3. In combination, a bolt, a plurality of asymmetric units mounted thereon and each comprising a copper disc having a layer of copper oxide formed on one side thereof, finely divided carbon applied to the oxide surface of each unit, an electrode in contact with the carbonized surface of each unit comprising porous fibrous material impregnated with finely divided conducting material, and means on said bolt for clamping said units and said electrodes together.

4. In a rectifying device, a copper plate having a layer of cuprous oxide formed on one side thereof, a carbon coating applied to the oxide surface of said plate, and two electrodes for connecting said device in an electrical circuit, one such electrode being in contact with the copper and the other electrode being in contact with the carbon coating, and each said electrode comprising porous fibrous material impregnated with finely divided conducting material.

5. A rectifier comprising a plurality of rectifying units clamped together on a bolt and each consisting of a copper disc having a coating of cuprous oxide formed on one side thereof, and an electrode in contact with the oxide surface of each unit, each said electrode comprising porous fibrous material impregnated with finely divided conducting material.

6. An electrical rectifier comprising a metal plate having a coating of a compound of the metal formed thereon, a carbon coating in contact with said first mentioned coating, and an electrode consisting of a mixture of fibrous material and conducting material in contact with said carbon coating.

RICHARD A. HARTLEY.
CRAIG M. BOUTON.